US012429016B2

(12) United States Patent
Sekine

(10) Patent No.: US 12,429,016 B2
(45) Date of Patent: Sep. 30, 2025

(54) CARBURETTOR ASSEMBLY

(71) Applicant: HUSQVARNA AB, Huskvarna (SE)

(72) Inventor: Akiyoshi Sekine, Saitama (JP)

(73) Assignee: HUSQVARNA AB, Huskvarna (SE)

( * ) Notice: Subject to any disclaimer, the term of this patent is extended or adjusted under 35 U.S.C. 154(b) by 240 days.

(21) Appl. No.: 18/086,055

(22) Filed: Dec. 21, 2022

(65) Prior Publication Data

US 2023/0204005 A1 Jun. 29, 2023

(30) Foreign Application Priority Data

Dec. 27, 2021 (JP) ................................ 2021-211933

(51) Int. Cl.
*F02M 19/03* (2006.01)
*F02M 3/10* (2006.01)

(52) U.S. Cl.
CPC .............. *F02M 19/03* (2013.01); *F02M 3/10* (2013.01)

(58) Field of Classification Search
CPC ................................ F02M 19/03; F02M 3/10
See application file for complete search history.

(56) References Cited

U.S. PATENT DOCUMENTS 6,439,546 B1 * 8/2002 Galka .................... F02M 37/20 261/DIG. 68
2014/0306358 A1 10/2014 Learman et al.

FOREIGN PATENT DOCUMENTS

| | | | |
|---|---|---|---|
| CN | 209604178 | U | 11/2019 |
| DE | 10142247 | A1 | 3/2002 |
| JP | H11247719 | A | 9/1999 |
| JP | 2003148251 | A | 5/2003 |
| JP | 2020523511 | A | 8/2020 |

OTHER PUBLICATIONS

Notice of Reasons for Refusal from corresponding Japanese Application No. 2021-211933 mailed Feb. 25, 2025, all pages cited in its entirety.

* cited by examiner

*Primary Examiner* — Robert A Hopkins
(74) *Attorney, Agent, or Firm* — Burr & Forman

(57) ABSTRACT

[Problem] To provide a carburettor assembly which suppresses dripping of fuel from a nozzle to an air-fuel mixing passage during idling.
[Solution] The carburettor assembly comprises: a fuel chamber 12 for storing a fuel for supply to an air-fuel mixing passage 11; a nozzle 13 which comprises a check valve 13*a* and discharges the fuel to the air-fuel mixing passage 11, the nozzle 13 being arranged at a position in the air-fuel mixing passage 11 in which the fuel drops naturally; a plurality of holes 14 for discharging the fuel to the air-fuel mixing passage 11 during idling, at a position in an air-fuel mixture flow downstream from a position of the nozzle 13 in the air-fuel mixing passage 11; a fuel passage 15 for connecting the fuel chamber 12 and the nozzle 13 and also connecting the fuel chamber 12 and the plurality of holes 14; and a resistor 25 which is arranged in the fuel passage 15 between the fuel chamber 12 and the nozzle 13, and thereby forms resistance against a fuel flow directed to the nozzle 13.

20 Claims, 2 Drawing Sheets

[Fig. 1]
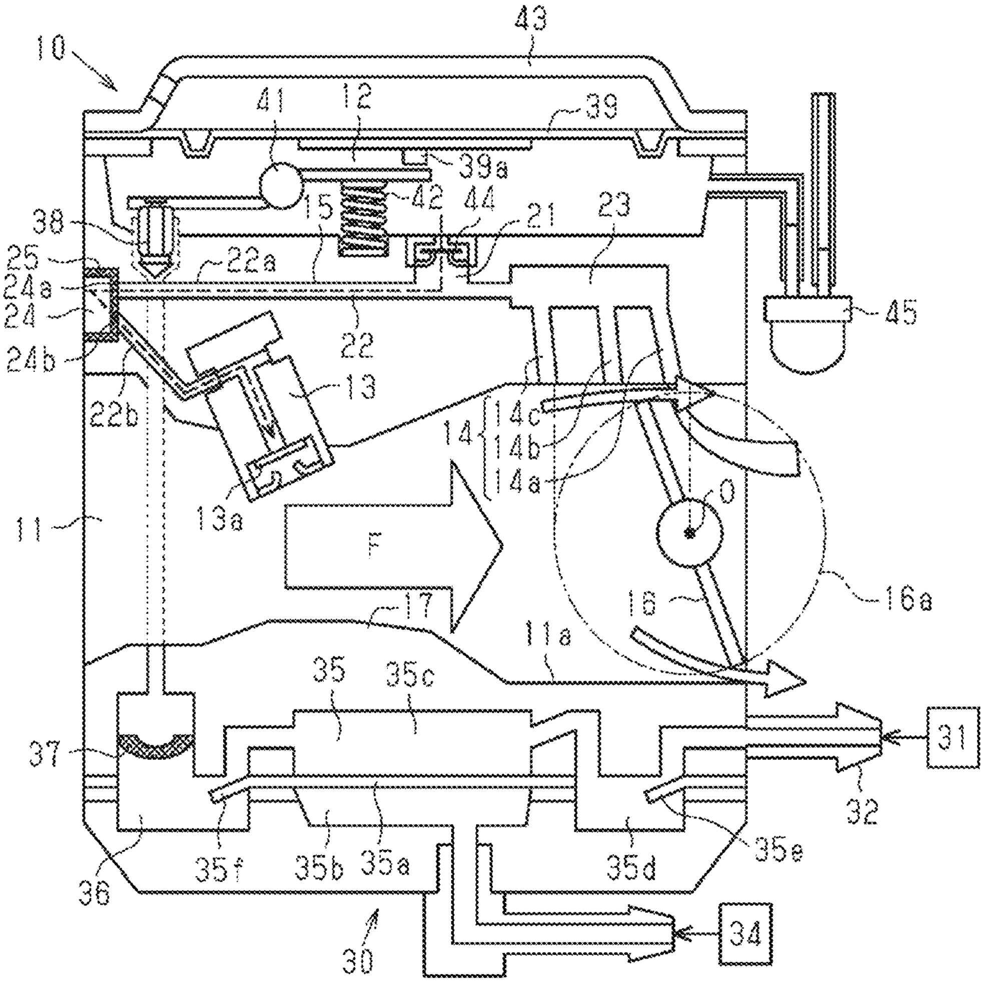

[Fig. 2]
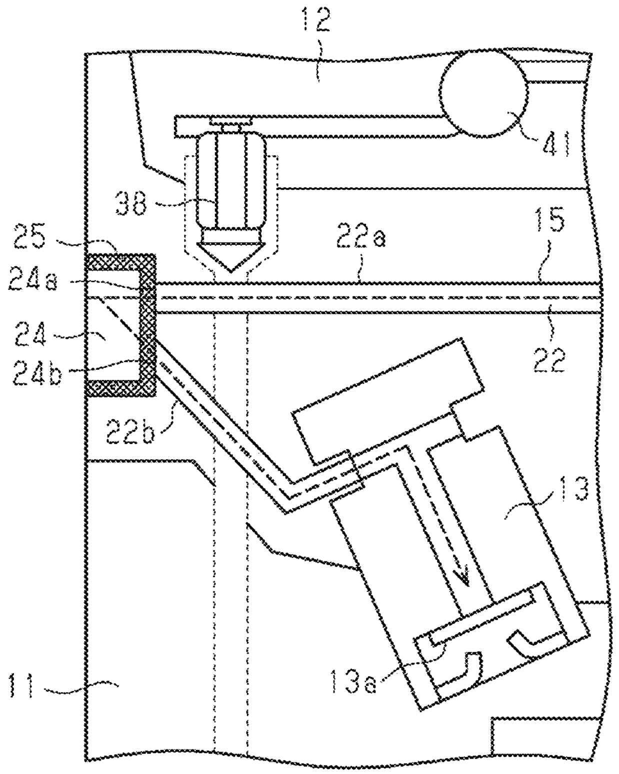

CARBURETTOR ASSEMBLY

TECHNICAL FIELD

The present invention relates to a carburettor assembly.

BACKGROUND ART

An engine mounted in a portable work machine such as a chainsaw, strimmer or blower comprises a carburettor assembly (see Patent Document 1). The carburettor assembly comprises an air-fuel mixing passage, a throttle valve, a fuel chamber, a nozzle, and a plurality of holes. Fuel and air are mixed in the air-fuel mixing passage. The throttle valve is arranged in the air-fuel mixing passage and regulates an air-fuel mixture amount. The fuel chamber stores fuel supplied from a fuel tank. The nozzle discharges fuel from the fuel chamber to the air-fuel mixing passage during a higher rotation speed than during idling, which is achieved by a throttle lever operation. The plurality of holes discharge a small amount of fuel by means of suction negative pressure during idling. The fuel chamber, the nozzle and the plurality of holes communicate by means of the fuel passage.

The throttle valve is in an almost closed state during idling, and a small amount of the fuel is discharged to the air-fuel mixing passage from one hole by means of suction negative pressure. At this time, a check valve of the nozzle is in a closed state because of greater negative pressure in the fuel passage than in the air-fuel mixing passage. During high-speed rotation, the throttle valve opens and there is greater negative pressure in the fuel passage than in the air-fuel mixing passage, so fuel is also discharged from the nozzle to the air-fuel mixing passage.

PRIOR ART DOCUMENT

Patent Document

[Patent Document 1] JP 2020-623511 A

SUMMARY OF THE INVENTION

Despite the fact that the check valve of the nozzle should be in a closed state during idling, vibration or the like may cause the check valve to open temporarily, which may cause the fuel to drip. Fuel may also drip from the nozzle because the check valve does not return to the closed state from the open state with good responsiveness when the engine has transitioned from high-speed rotation to an idling state. When this happens, the air-fuel mixture contains an excessive amount of fuel during idling, and the engine rotation speed becomes unstable.

Means for Solving the Problems

A carburettor assembly for solving the abovementioned problems mixes fuel and air in an air-fuel mixing passage, and comprises: a fuel chamber for storing the fuel for supply to the air-fuel mixing passage; a nozzle which comprises a check valve and discharges the fuel to the air-fuel mixing passage by opening/closing of the check valve; one or more holes for discharging the fuel to the air-fuel mixing passage during idling, at a position downstream of a position of the nozzle in the air-fuel mixing passage; a fuel passage for connecting the fuel chamber and the nozzle and also connecting the fuel chamber and the hole(s); and a resistor which is arranged in the fuel passage between the fuel chamber and the nozzle, and thereby forms resistance against a fuel flow directed to the nozzle.

By virtue of the configuration above, fuel is discharged from the hole(s) to the air-fuel mixing passage during idling, and there is greater negative pressure in the fuel passage than in the air-fuel mixing passage, so the check valve of the nozzle is closed. The check valve in the closed state may temporarily open for a variety of reasons. The flow of fuel to the nozzle is obstructed by the resistor even in such cases. It is therefore possible to inhibit dripping of fuel from the nozzle to the air-fuel mixing passage during idling.

The carburettor assembly described above may be configured so that the nozzle is arranged at a position in the air-fuel mixing passage in which the fuel drops naturally in a regular state which is a normal usage attitude. By virtue of this configuration, it is possible to inhibit dripping of fuel from the nozzle into the air-fuel mixing passage during idling in a regular state.

The carburettor assembly described above may be configured so that the fuel passage comprises: a common fuel passage connected to the fuel chamber; a first fuel passage for connecting the common fuel passage and the nozzle; and a second fuel passage for connecting the common fuel passage and the hole(s). By virtue of this configuration, a piping structure of the fuel passage for supplying the fuel from the fuel chamber to the nozzle and the hole(s) can be simplified.

The carburettor assembly described above may be configured so that the first fuel passage comprises a chamber partway between the fuel chamber and the nozzle, the chamber comprises an inflow port through which the fuel flows in from the fuel chamber, and an outflow port through which the fuel flows out from the chamber to the nozzle, and the resistor is arranged in at least one of a position of the inflow port and a position of the outflow port. By virtue of this configuration, simply by arranging the resistor in the chamber, the resistor can be arranged in at least one of the position of the inflow port and the position of the outflow port.

The carburettor assembly described above may be configured so that the resistor is formed by a metal mesh sheet. By virtue of this configuration, the resistor can be easily produced. The resistor can then be easily produced by using a metal mesh sheet with a different mesh count in order to adjust the resistance.

The carburettor assembly described above may be configured so that the resistor is formed by a metal mesh sheet, and the resistor has a shape capable of mating with the chamber. By virtue of this configuration, the resistor can be easily arranged at a predetermined position in the chamber.

The carburettor assembly described above may be configured so that the air-fuel mixing passage comprises a throttle valve at a position downstream of the position of the nozzle, there are a plurality of the holes, and at least one of the plurality of holes is arranged at a position overlapping an opening/closing operating range of the throttle valve inside the air-fuel mixing passage.

By virtue of the configuration above, it is possible to increase the number of holes from which the fuel is sucked out by suction negative pressure in the air-fuel mixing passage as the throttle valve is opened, and the amount of fuel supplied to the air-fuel mixing passage can be progressively increased.

Advantage of the Invention

According to the present invention, it is possible to suppress dripping of fuel from the nozzle to the air-fuel mixing passage during idling.

BRIEF DESCRIPTION OF THE DRAWINGS

FIG. 1 is a schematic diagram showing the configuration of a carburettor assembly.

FIG. 2 is a schematic diagram showing the action of a screen arranged in a chamber.

EMBODIMENT OF THE INVENTION

The carburettor assembly will be described below with the aid of FIGS. 1 and 2.

The carburettor assembly is provided in an engine mounted in various types of portable work machines such as a strimmer, a chainsaw or a hedge trimmer. The engine referred to here is a two-stroke engine, by way of example.

The carburettor assembly comprises a main body 10, the main body 10 comprising: an air-fuel mixing passage 11, a fuel chamber 12, a nozzle 13, holes 14, and a fuel passage 15.

The air-fuel mixing passage 11 is formed on an inner side of a cylindrical passage wall 11*a* constituting the air-fuel mixing passage 11. A choke valve (not depicted) is arranged in the air-fuel mixing passage 11 on an upstream side in relation to an air flow F, by way of example. A throttle valve 16 is arranged on a downstream side in the direction of the air flow F. A venturi 17 for constricting the air flow F to increase the flow velocity is formed in the air-fuel mixing passage 11 between the choke valve and the throttle valve 16. The venturi 17 constricts the air-fuel mixing passage 11 as a result of the passage wall 11*a* bulging inward.

The fuel chamber 12 temporarily stores fuel from a fuel tank 31. By way of example, the fuel chamber 12 is maintained substantially at atmospheric pressure. The fuel chamber 12 supplies the fuel to the fuel passage 15 via a check valve 44.

The nozzle 13 is arranged at a position facing into the air-fuel mixing passage 11 in which the fuel drops naturally within the passage wall 11*a* of the air-fuel mixing passage 11. By way of example, the nozzle 13 is arranged on an upper side in a regular state which is a normal usage attitude of the portable work machine. That is to say, the nozzle 13 is arranged at any position in the upper half of the air-fuel mixing passage 11 as seen in a cross section orthogonal to an axial direction of the air-fuel mixing passage 11. The fuel drops from the nozzle 13 under its own weight. Furthermore, the nozzle 13 is arranged at the position of maximum constriction in the venturi 17, or on the upstream side in the air flow F.

The nozzle 13 comprises a check valve 13*a*. The check valve 13*a* is a non-return valve which allows fuel supplied from the fuel passage 15 to be discharged to the air-fuel mixing passage 11, while also obstructing a return flow of the fuel from the air-fuel mixing passage 11 to the fuel passage 15. During idling, the check valve 13*a* is in a closed state because of greater negative pressure inside the fuel passage 15 than the air-fuel mixing passage 11. When the engine rotates at a higher speed than idling, the check valve 13*a* opens because of greater negative pressure inside the air-fuel mixing passage 11 than the fuel passage 15, and fuel is discharged to the air-fuel mixing passage 11 by means of suction negative pressure as a result.

The fuel passage 15 forms a connection between the fuel chamber 12, the nozzle 13 and the holes 14. The fuel passage 15 comprises: a common fuel passage 21 connected to the fuel chamber 12; a first fuel passage 22 for connecting the common fuel passage 21 and the nozzle 13; and a second fuel passage 23 for connecting the common fuel passage 21 and the holes 14. The common fuel passage 21 communicates with the first fuel passage 22 and the second fuel passage 23. The common fuel passage 21 is connected at one end to the fuel chamber 12 by way of the check valve 44, and branches at the other end into the first fuel passage 22 and the second fuel passage 23. The common fuel passage 21, the first fuel passage 22, and the second fuel passage 23 have a diameter of around several hundred μm, by way of example. These are therefore narrow passages. Furthermore, the common fuel passage 21, the first fuel passage 22, and the second fuel passage 23 may each have a different thickness, depending on positions thereof.

A chamber 24 is provided in the first fuel passage 22 between an end which connects to the common fuel passage 21 and the nozzle 13. The chamber 24 is a small compartment formed by a recess with one open face. Here, the chamber 24 is a recess having a circular shape, by way of example. The first fuel passage 22 comprises a first passage 22*a* between the end which connects to the common fuel passage 21 and the chamber 24, and a second passage 22*b* between the chamber 24 and the nozzle 13. A bottom face of the chamber 24 comprises a fuel inflow port 24*a*, which is an end of the first passage 22*a*, and also comprises an outflow port 24*b*, which is an end of the second passage 22*b*. The chamber 24 forms a buffer for temporary fuel storage during the time until the fuel which has flowed in from the inflow port 24*a* flows out from the outflow port 24*b*.

The chamber 24 is a recess for forming the first passage 22*a* and the second passage 22*b* by means of a drill. The chamber 24 is closed off by a cap to ensure that fuel does not leak to the outside. A resistor 25 which forms resistance to inhibit a fuel flow from the fuel chamber 12 to the nozzle 13 is arranged in the chamber 24.

The resistor 25 is a screen obtained by moulding a metal mesh sheet into a bottomed cylindrical shape or cylindrical shape that is capable of mating with the chamber 24. The metal mesh sheet is a stainless steel mesh sheet, by way of example. Furthermore, the mesh size has a mesh count of 10 or more per inch. Furthermore, the mesh count is 500 or less. This resistor 25 is a member that forms resistance to the flow of fuel while also allowing the fuel to pass therethrough. The resistor 25 forms resistance to inhibit the fuel flow at the two locations of the inflow port 24*a* and the outflow port 24*b*. Moreover, the resistor 25 is a mesh and may therefore also trap contaminants contained in the fuel. This kind of resistor 25 is simple to produce and can also be easily replaced. The resistor 25 may also be replaced with a metal mesh sheet produced with a different mesh count, in order to adjust the resistance. The resistor 25 having a bottomed cylindrical shape is arranged so that the bottom face thereof closes off the inflow port 24*a* and the outflow port 24*b*. Side faces of the resistor 25 standing upright in relation to the bottom face thereof constitute positioning walls for arrangement in the chamber 24.

Between the fuel chamber 12 and the nozzle 13, the fuel from the fuel chamber 12 flows to the nozzle 13 through the first passage 22*a*, the chamber 24, and the second passage 22*b*. The fuel is temporarily stored in the chamber 24. During idling, the check valve 13*a* is kept in a closed state because there is greater negative pressure in the fuel passage 15 than in the air-fuel mixing passage 11.

If vibration is applied at this time, the check valve 13*a* may temporarily open. In particular, if the portable work machine is placed on a hard road surface such as asphalt while idling, a larger amount of vibration is also applied to the carburettor assembly than when the portable work machine is placed on a soil surface. In such a case, the vibration may cause the check valve 13*a* to temporarily open. Furthermore, the check valve 13*a* may also not close with good responsiveness when the engine has returned to an idling state from high-speed rotation.

In this case also, the resistor 25 is arranged in the chamber 24 in the first fuel passage 22. This means that the fuel is less likely to flow in the direction of the nozzle, and dripping of the fuel into the air-fuel mixing passage 11 is inhibited as a result.

When the engine moves from idling to high-speed rotation, the check valve 13*a* is placed in an open state because there is greater negative pressure in the air-fuel mixing passage 11 than in the first fuel passage 22. At this time, the fuel supplied from the fuel chamber 12 to the nozzle 13 flows to the nozzle 13 through the resistor 25 arranged at the inflow port 24*a* and the resistor 25 arranged at the outflow port 24*b*. The fuel is then sucked out from the second passage 22*b* and discharged into the air-fuel mixing passage 11.

The holes 14 are arranged in the passage wall 11*a* close to the throttle valve 16. The plurality of holes 14 comprise three holes in this embodiment: a first hole 14*a*, a second hole 14*b*, and a third hole 14*c*. The first hole 14*a*, the second hole 14*b*, and the third hole 14*c* are arranged in a row in the direction of the air flow F. In this embodiment, the first hole 14*a* is positioned furthest downstream in the air flow F, the second hole 14*b* is positioned one back upstream, and the third hole 14*c* is positioned furthest upstream. The first hole 14*a*, the second hole 14*b*, and the third hole 14 serve as sub-jets in relation to the nozzle 13.

The positions in which the three holes 14*a*, 14*b*, 14*c* are provided are arranged so that at least one of the holes overlaps an opening/closing operating range 16*a* of the throttle valve 16. In this embodiment, by way of example, the first hole 14*a* is arranged at a position largely corresponding to a centre of rotation O of the throttle valve 16. Furthermore, the third hole 14*c* is located at the position furthest downstream and is arranged correspondingly with the downstream side of the opening/closing operating range 16*a*.

The throttle valve 16 opens and closes the air-fuel mixing passage 11 in line with a user operation of a throttle lever. The throttle valve 16 regulates an amount of the air-fuel mixture supplied from the carburettor to the engine so that the engine rotation speed changes. By way of example, the throttle valve 16 is a butterfly valve which comprises an opening/closing plate, and a pivot shaft for supporting the opening/closing plate so as to be pivotable about the centre of rotation O of the opening/closing plate.

FIG. 1 shows the state of the throttle valve 16 in an idling state. In the idling state, the throttle valve 16 is largely in a closed state, and a minute gap is formed between the throttle valve 16 and the passage wall 11*a*. The flow velocity of the air flow F is therefore increased in this minute gap. Specifically, a tip end of the throttle valve 16 is positioned between the first hole 14*a* and the second hole 14*b*. Because of the increased flow velocity, fuel for idling is sucked out by means of suction negative pressure from the first hole 14*a* located downstream from the tip end of the throttle valve 16.

Fuel is not discharged from the second hole 14*b* or the third hole 14*c* located upstream from the tip end of the throttle valve 16.

Fuel is also discharged from the second hole 14*b* as the throttle valve 16 opens. That is to say, suction negative pressure is also exerted on the second hole 14*b* so that fuel starts to be discharged. When the throttle valve 16 opens further, fuel is also discharged from the third hole 14*c*. That is to say, fuel is discharged from all of the holes 14*a*, 14*b*, 14*c*.

A fuel supply mechanism 30 for supplying the fuel to the fuel chamber 12 will be described next. The fuel supply mechanism 30 is connected to the fuel tank 31 by a tank connector 32. The tank connector 32 is connected to a buffer chamber 35 via a connecting passage 35*d*. The buffer chamber 35 comprises: a pump diaphragm 35*a*, and a downstream pulse chamber 35*b* and upstream pump chamber 35*c* delimited by means of the pump diaphragm 35*a*. The pump diaphragm 35*a* is an ultra-thin sheet formed from rubber or a resin, etc. The connecting passage 35*d* comprises a non-return valve 35*e* for preventing a return flow of the fuel.

The pulse chamber 35*b* is connected to a crankcase 34. The pump diaphragm 35*a* is displaced in accordance with a pressure increase or reduction (pulse) inside the crankcase 34 by means of reciprocating movement of a piston. The pump chamber 35*c* feeds out fuel therein as the pressure increases or decreases. A connecting passage 36 is connected to a downstream side of the pump chamber 35*c*. The connecting passage 36 comprises a non-return valve 35*f*. A return flow of the fuel is prevented by means of an upstream non-return valve 35*e* and a downstream non-return valve 35*f* in the pump chamber 35*c*. The connecting passage 36 comprises a filter 37 downstream of the non-return valve 35*f*. The filter 37 traps contaminants contained in the fuel. The filter 37 is a metal mesh sheet, by way of example. As an example, a metal mesh sheet the same as that of the resistor 25 is used for the filter 37.

An inlet valve 38 is arranged at a connection of the fuel chamber 12 and the connecting passage 36. The inlet valve 38 is an open/close valve for opening/closing the connection, and regulates the fuel flowing into the fuel chamber 12. The inlet valve 38 closes the connection when the engine is stopped, and always displaces while following displacement of a diaphragm 39 in a state of having opened the connection during operation. A lever 41 is connected to the inlet valve 38.

The lever 41 is pivotably supported by a pivot shaft. The inlet valve 38 is attached to one end of the lever 41 in relation to the pivot shaft. A spring 42 is attached to the other end on the opposite side of the pivot shaft to said one end. The spring 42 biases said other end of the lever 41 upward so as to close the inlet valve 38 when the engine is stopped. As a result, said one end of the lever 41 produces a state in which the inlet valve 38 is closed.

The diaphragm 39 is also an ultra-thin sheet formed from rubber or a resin, etc. The diaphragm 39 is fixed by means of a cover 43. The diaphragm 39 descends when fuel in the fuel chamber 12 is fed into the engine. When this happens, a protrusion 39*a* arranged in the centre of the diaphragm 39 depresses the lever 41 against a biasing force of the spring 42. By this means, the inlet valve 38 is lifted to thereby open the connection. By this means, any shortfall in fuel is supplied to the fuel chamber 12.

A primary pump 45 connected to the fuel tank 31 is arranged in the fuel chamber 12. There may be no fuel in the fuel chamber 12 when the engine is started up initially, etc.

In this case, the primary pump 45 is pressed several times so that fuel inside the fuel tank 31 is drawn up and fuel is supplied to the fuel chamber 12.

The connection of the fuel chamber 12 and the common fuel passage 21 comprises the check valve 44. The check valve 44 is a non-return valve. The check valve 44 prevents the ingress of air from the first hole 14*a*, the second hole 14*b*, and the third hole 14*c* when fuel is sucked up by the primary pump 45.

(Description of Operation)

When the engine is stopped, the throttle valve 16 is in a state of having closed the air-fuel mixing passage 11. When there is no fuel in the fuel chamber 12, fuel is supplied to the fuel chamber 12 by means of the primary pump 45. The check valve 13*a* of the nozzle 13 is also in a closed state.

During idling, the throttle valve 16 is in a slightly open state, and the tip end thereof is located between the first hole 14*a* and the second hole 14*b*. In this state, the flow velocity of the air flow F is increased by the minute gap formed between the tip end of the throttle valve 16 and the passage wall 11*a*. As a result, there is greater negative pressure in the first hole 14*a* than the air-fuel mixing passage 11, so fuel for idling is sucked out from the second fuel passage 23 into the air-fuel mixing passage 11. At this time, the check valve 13*a* is maintained in a closed state because there is greater negative pressure inside the fuel passage 15 than the air-fuel mixing passage 11.

When the throttle lever is operated so that the throttle valve 16 gradually opens to change from idling to high-speed rotation, suction negative pressure is also exerted on the second hole 14*b* so that fuel is discharged. As the throttle valve 16 opens further, suction negative pressure is also exerted on the third hole 14*c* so that fuel is discharged. After this, the flow velocity of the air flow F increases in the air-fuel mixing passage 11, and when a greater negative pressure is reached in the air-fuel mixing passage 11 than the first fuel passage 22, the check valve 13*a* also opens and fuel in the first fuel passage 22 starts to be discharged. That is to say, fuel is supplied to the air-fuel mixing passage 11 from the nozzle 13 and from the holes 14*a*, 14*b*, 14*c*. The fuel flows through the first fuel passage 22 in the order of: first passage 22*a*, chamber 24, second passage 22*b*.

When the engine returns to idling, the throttle valve 16 is closed, whereby the flow velocity of the air-fuel mixture gradually decreases. As a result, the check valve 13*a* closes, and the discharge of fuel is then stopped in the order of: third hole 14*c*, second hole 14*b*. The state is then such that fuel is discharged only from the first hole 14*a*. During this idling, the fuel remains in the first passage 22*a*, the chamber 24, and the second passage 22*b* and the second fuel passage 23.

If the portable work machine is placed on a hard road surface such as asphalt while idling, a larger amount of vibration is also applied to the carburettor assembly than when the portable work machine is placed on a soil surface. In such a case, the vibration may cause the check valve 13*a* to temporarily open. Furthermore, the check valve 13*a* may also not close with good responsiveness when the engine has returned to an idling state from high-speed rotation. In such a case also, the resistor 25 is arranged in the chamber 24, and forms resistance to inhibit the flow of fuel inside the first fuel passage 22 to the nozzle 13. Accordingly, even if the check valve 13*a* has temporarily opened while the engine is idling, the fuel in the first fuel passage 22 can be made less likely to drip into the air-fuel mixing passage 11. This makes it possible to stabilize the rotation speed of the engine.

Advantages of the Embodiment

The embodiment above makes it possible to achieve the following advantages.

(1) During idling, fuel is discharged from the first hole 14*a* to the air-fuel mixing passage 11, and there is greater negative pressure in the fuel passage 15 than in the air-fuel mixing passage 11, so the check valve 13*a* is closed. Even if the closed check valve 13*a* is temporarily opened, the flow of fuel to the nozzle 13 is impeded by the resistor 25. It is therefore possible to inhibit dripping of the fuel from the nozzle into the air-fuel mixing passage 11 during idling.

(2) A portable work machine is normally used much more often in a regular state than in a state other than the regular state. The nozzle 13 is arranged at a position in the air-fuel mixing passage 11 in which the fuel drops naturally in the regular state which is used for long periods of time. Accordingly, an effect of suppressing dripping of the fuel from the nozzle 13 into the air-fuel mixing passage 11 during idling can be efficiently achieved in the regular state.

(3) Dripping of the fuel from the nozzle 13 into the air-fuel mixing passage 11 can be suppressed not only during idling but also during the time from idling until the throttle valve 16 is fully open, in other words, essentially during the period requiring control so that fuel is not discharged from the nozzle 13. As a result, it is possible to optimize the fuel which is supplied to the air-fuel mixing passage 11 during this period also. Furthermore, the timing for discharge of fuel from the nozzle 13 can also be optimized.

(4) The fuel passage 15 has a structure in which the first fuel passage 22 and the second fuel passage 23 branch from the common fuel passage 21. It is therefore possible to simplify the piping structure of the fuel passage 15 for supplying the fuel from the fuel chamber 12 to the nozzle 13 and the holes 14.

(5) The chamber 24 is a compartment formed by a recess with one open face. The resistor 25 can therefore be easily attached to the chamber 24.

(6) The resistor 25 has a shape capable of mating with the chamber 24 by virtue of a metal mesh sheet. The resistor 25 can therefore be arranged in the chamber 24 in such a way that it is unlikely to become misaligned with the positions of the inflow port 24*a* and the outflow port 24*b*.

(7) The resistor 25 can be easily produced by means of a metal mesh sheet. Furthermore, the resistor 25 can be produced by using a metal mesh sheet with a different mesh count in order to adjust the resistance. As a result, the resistance can be easily adjusted by changing the mesh count of the resistor 25.

(8) It is possible to increase the number of holes from which the fuel is sucked out by negative pressure in the air-fuel mixing passage 11 as the throttle valve 16 is opened, and the amount of fuel supplied to the air-fuel mixing passage 11 can be progressively increased.

Variant Examples

It should be noted that the embodiment described above may also be implemented with the following appropriate modifications.

The number of holes 14 is not limited to three. There may be one or two, or four or more holes 14. The number of holes 14 may be appropriately set according to the size and shape, etc. of the holes 14.

During idling, the tip end of the throttle valve 16 may be positioned between the second hole 14*b* and the third hole 14*c*, or it may be positioned upstream of the third hole 14*c*.

Furthermore, the third hole 14*c* may also be arranged so as to overlap the opening/closing operating range 16*a*.

That is to say, the number and shape, etc. of the holes 14 are set so that fuel is suitably discharged during idling.

The resistor 25 need not have a shape capable of mating with the chamber 24. It is sufficient for the resistor 25 to be arranged so as to close off the inflow port 24*a* and the outflow port 24*b*. A sheet may therefore be fixed by means of an adhesive or a fixing member such as a screw so as to close off the inflow port 24*a* and the outflow port 24*b*. Furthermore, separate metal mesh sheets may equally be fixed to close off the inflow port 24*a* and the outflow port 24*b*.

Provided that the resistor 25 is capable of suppressing dripping from the nozzle 13 during idling, it may simply be arranged on only either one of the inflow port 24*a* and the outflow port 24*b*.

Provided that the resistor 25 is a member that forms resistance to the flow of fuel while also allowing the fuel to pass therethrough, the resistor 25 is not limited to a metal mesh sheet, and it may equally be a porous body, etc. that forms resistance to the flow of fuel, for example.

The resistor 25 may be obtained by stacking a plurality of metal mesh sheets. Furthermore, the resistor 25 may be a resin mesh sheet.

The chamber 24 may be omitted from the first fuel passage 22. In this case, for example, it is possible to adopt a configuration in which a porous body is provided inside the first fuel passage 22 as the resistor 25.

The common fuel passage 21 may be omitted from the fuel passage 15 so that the first fuel passage 22 connects the fuel chamber 12 and the nozzle 13, while the second fuel passage 23 connects the fuel chamber 12 and the holes 14. In this case, the chamber 24 may or may not be omitted from the first fuel passage 22. If the chamber 24 is omitted, the configuration will be such that the resistor 25 is arranged partway along or at an inlet or outlet of the first fuel passage 22.

The nozzle 13 need not be arranged at a position in which the fuel naturally drops into the air-fuel mixing passage 11 in a regular state which is a normal usage attitude. For example, the nozzle 13 may be arranged at any position in the lower half of the air-fuel mixing passage 11 as seen in a cross section orthogonal to the axial direction of the air-fuel mixing passage 11. In this case also, the nozzle 13 will be positioned on the upper side when the portable work machine is used in an upside down state. In such a case, dripping of the fuel from the nozzle 13 into the air-fuel mixing passage 11 can be inhibited during idling.

The throttle valve 16 may be fully closed during idling also.

The carburettor assembly may also be applied to a stratified-scavenging two-stroke engine which further comprises an air passage for introducing induced air for cylinder scavenging. In this case, the carburettor assembly comprises the air-fuel mixing passage 11 and the air passage. The air-fuel mixing passage 11, which may comprise the nozzle 13 and the holes 14, is then arranged on the upper side of the air passage. During scavenging, the induced air in the air passage first of all scavenges exhaust gas in a combustion chamber. It is therefore possible to reduce the amount of air-fuel mixture expelled together with the exhaust gas during scavenging as compared to a two-stroke engine in which exhaust gas is scavenged by the air-fuel mixture.

The engine may be utilized in a portable work machine such as a chainsaw, strimmer or blower.

KEY TO SYMBOLS

11 . . . Air-fuel mixing passage
11*a* . . . Passage wall
12 . . . Fuel chamber
13 . . . Nozzle
13*a* . . . Check valve
14 . . . Hole
14*a* . . . First hole
14*b* . . . Second hole
14*c* . . . Third hole
16 . . . Throttle valve
17 . . . Venturi
21 . . . Common fuel passage
22 . . . First fuel passage
22*a* . . . First passage
22*b* . . . Second passage
23 . . . Second fuel passage
24 . . . Chamber
24*a* . . . Inflow port
24*b* . . . Outflow port
25 . . . Resistor

The invention claimed is:

1. A carburetor assembly for mixing fuel and air in an air-fuel mixing passage, the carburetor assembly comprising:

a fuel chamber for storing the fuel for supply to the air-fuel mixing passage;

a nozzle which comprises a check valve and discharges the fuel to the air-fuel mixing passage by opening/closing of the check valve;

one or more holes for discharging the fuel to the air-fuel mixing passage during idling, at a position downstream of a position of the nozzle in the air-fuel mixing passage;

a fuel passage for connecting the fuel chamber and the nozzle and also connecting the fuel chamber and the one or more holes; and a resistor which is arranged in the fuel passage between the fuel chamber and the nozzle, and thereby forms resistance against a fuel flow directed to the nozzle, wherein the nozzle is arranged at an upper side of the air-fuel mixing passage, and in a regular state, the fuel drops naturally into the air-fuel mixing passage due to its own weight.

2. The carburetor assembly according to claim 1, wherein the fuel passage comprises: a common fuel passage connected to the fuel chamber; a first fuel passage for connecting the common fuel passage and the nozzle; and a second fuel passage for connecting the common fuel passage and the one or more holes.

3. The carburetor assembly according to claim 2, wherein the first fuel passage comprises a chamber partway between the fuel chamber and the nozzle, the chamber comprises an inflow port through which the fuel flows in from the fuel chamber, and an outflow port through which the fuel flows out from the chamber to the nozzle, and the resistor is arranged in at least one of a position of the inflow port and a position of the outflow port.

4. The carburetor assembly according to claim 1, wherein the resistor is formed by a metal mesh sheet.

5. The carburetor assembly according to claim 3, wherein the resistor is formed by a metal mesh sheet, and the resistor has a shape capable of mating with the chamber.

6. The carburetor assembly according to claim 1, wherein the air-fuel mixing passage comprises a throttle valve at a position downstream of the position of the nozzle, there are a plurality of the holes, and at least one of the plurality of holes is arranged at a position overlapping an opening/closing operating range of the throttle valve inside the air-fuel mixing passage.

7. The carburetor assembly according to claim 1, wherein the check valve is disposed at a passage wall of the air-fuel mixing passage.

8. The carburetor assembly according to claim 5, wherein the resistor comprises a cylindrical shape configured to close off the inflow port and the outflow port.

9. A carburetor assembly for mixing fuel and air in an air-fuel mixing passage, the carburetor assembly comprising:

a fuel chamber for storing the fuel for supply to the air-fuel mixing passage;

a nozzle which comprises a check valve and discharges the fuel to the air-fuel mixing passage by opening/closing of the check valve;

one or more holes for discharging the fuel to the air-fuel mixing passage during idling, at a position downstream of a position of the nozzle in the air-fuel mixing passage;

a fuel passage for connecting the fuel chamber and the nozzle and also connecting the fuel chamber and the one or more holes; and a resistor which is arranged in the fuel passage between the fuel chamber and the nozzle, and thereby forms resistance against a fuel flow directed to the nozzle, wherein the fuel passage comprises: a common fuel passage connected to the fuel chamber; a first fuel passage for connecting the common fuel passage and the nozzle; and a second fuel passage for connecting the common fuel passage and the one or more holes, wherein the first fuel passage comprises a chamber partway between the fuel chamber and the nozzle, wherein the chamber comprises an inflow port through which the fuel flows in from the fuel chamber, and an outflow port through which the fuel flows out from the chamber to the nozzle, wherein the resistor is arranged in at least one of a position of the inflow port and a position of the outflow port, wherein the resistor is formed by a metal mesh sheet, and wherein the resistor has a shape capable of mating with the chamber.

10. The carburetor assembly according to claim 9, wherein the nozzle is arranged at an upper side of the air-fuel mixing passage, and in a regular state, the fuel drops naturally into the air-fuel mixing passage due to its own weight.

11. The carburetor assembly according to claim 9, wherein the resistor is formed by a metal mesh sheet.

12. The carburetor assembly according to claim 9, wherein the air-fuel mixing passage comprises a throttle valve at a position downstream of the position of the nozzle, there are a plurality of the holes, and at least one of the plurality of holes is arranged at a position overlapping an opening/closing operating range of the throttle valve inside the air-fuel mixing passage.

13. The carburetor assembly according to claim 9, wherein the check valve is disposed at a passage wall of the air-fuel mixing passage.

14. A carburetor assembly for mixing fuel and air in an air-fuel mixing passage, the carburetor assembly comprising:

a fuel chamber for storing the fuel for supply to the air-fuel mixing passage;

a nozzle which comprises a check valve and discharges the fuel to the air-fuel mixing passage by opening/closing of the check valve;

one or more holes for discharging the fuel to the air-fuel mixing passage during idling, at a position downstream of a position of the nozzle in the air-fuel mixing passage;

a fuel passage for connecting the fuel chamber and the nozzle and also connecting the fuel chamber and the one or more holes; and a resistor which is arranged in the fuel passage between the fuel chamber and the nozzle, and thereby forms resistance against a fuel flow directed to the nozzle, wherein the fuel passage comprises: a common fuel passage connected to the fuel chamber; a first fuel passage for connecting the common fuel passage and the nozzle; and a second fuel passage for connecting the common fuel passage and the one or more holes, wherein the first fuel passage comprises a chamber partway between the fuel chamber and the nozzle, wherein the chamber comprises an inflow port through which the fuel flows in from the fuel chamber, and an outflow port through which the fuel flows out from the chamber to the nozzle, and wherein the resistor is arranged in at least one of a position of the inflow port and a position of the outflow port.

15. The carburetor assembly according to claim 14, wherein the nozzle is arranged at an upper side of the air-fuel mixing passage, and in a regular state, the fuel drops naturally into the air-fuel mixing passage due to its own weight.

16. The carburetor assembly according to claim 14, wherein the resistor is formed by a metal mesh sheet.

17. The carburetor assembly according to claim 14, wherein the resistor is formed by a metal mesh sheet, and the resistor has a shape capable of mating with the chamber.

18. The carburetor assembly according to claim 14, wherein the air-fuel mixing passage comprises a throttle valve at a position downstream of the position of the nozzle, there are a plurality of the holes, and at least one of the plurality of holes is arranged at a position overlapping an opening/closing operating range of the throttle valve inside the air-fuel mixing passage.

19. The carburetor assembly according to claim 14, wherein the check valve is disposed at a passage wall of the air-fuel mixing passage.

20. The carburetor assembly according to claim 17, wherein the resistor comprises a cylindrical shape configured to close off the inflow port and the outflow port.

* * * * *